Figure 1:
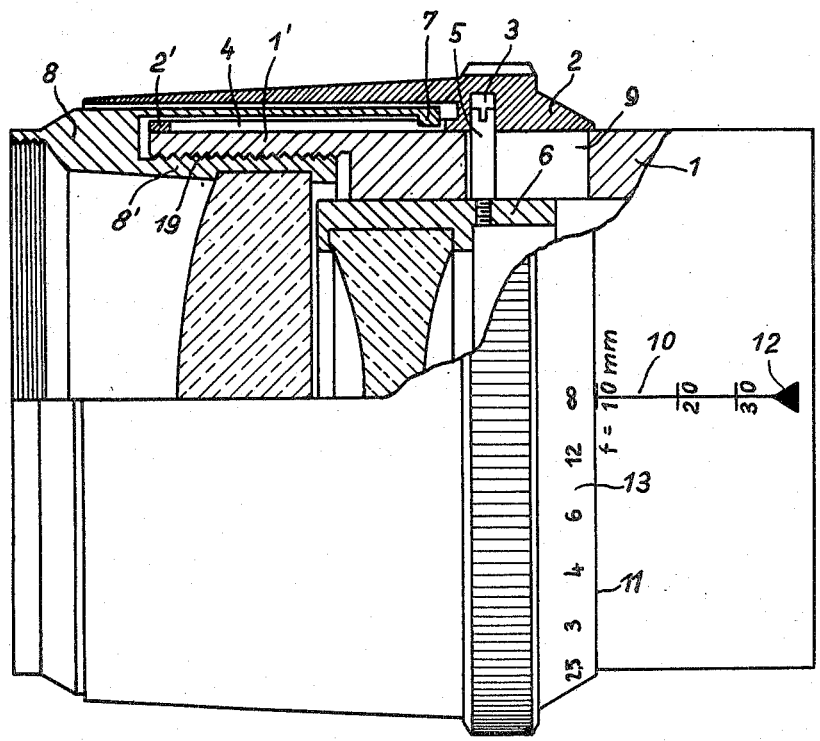

United States Patent Office 3,169,461
Patented Feb. 16, 1965

3,169,461
ADJUSTMENT MEANS FOR CAMERA
OBJECTIVES
Otto Erbe, Aalen, Wurttemberg, and Christian Ludwig, Oberkochen, Wurttemberg, Germany, assignors to Carl Zeiss, Oberkochen, Wurttemberg, Germany
Filed Feb. 13, 1961, Ser. No. 88,975
Claims priority, application Germany, Feb. 12, 1960, Z 6,430
3 Claims. (Cl. 95—45)

This invention relates to adjustment means for objectives with range and focus control in photographic and motion picture cameras.

It is known in objectives of the kind indicated to adjust the front lens through a rotary movement for focusing and independently thereof to move the focus adjusting element in axial direction by means of a link system or a slide ring. This known separate adjustment of range and focal length in a pancratic objective has operational disadvantages which are particularly noticeable in moving picture cameras provided with a finder coupled with a range finder. In such cameras the focusing is effected by sliding or rotating the respective adjustment element while viewing the finder image.

If optical traveling shots are to be made, the camera must be maintained at the eye and at the same time it is necessary that the operator shift his grip from one actuating member to the other. Such shifting is naturally associated with a degree of uncertainty and may readily cause an undesirable wobbling or swaying of the camera. Furthermore, with separate actuating members for range and focus adjustment, it is not practically feasible to perform both said adjustments simultaneously and at the same time view the finder image.

It is an object of the invention to eliminate the disadvantages described above by the provision of a single exterior actuating member, the axial movement of which for adjustment of the focal length effects an axial displacement of one or more optical elements within the objective holder, or mounting, while the rotary movement of said single exterior actuating member effects the adjustment of the objective to different focal distances through means which are known per se, such as a screw thread.

Another object of the invention is to provide the actuating member, preferably a ring, with an axially extending straight groove and a circular groove and to make the arrangements such that a pin connected with the focusing means in the objective engages in said circular groove while in the axial groove a transfer member engages which is connected with the rotatable range adjustment member of the objective.

A further object of the invention is to provide modified means of the kind indicated in which instead of the circular groove in the actuating ring the focusing means in the objective is provided with a circular groove in which a transmission member engages which is connected with the actuating ring and extends through a longitudinal slot in the objective mounting.

Still another object of the invention is to provide means of the kind indicated in which the actuating ring in order to facilitate operation thereof is provided with finger grips or a lever serving as handle.

Another object of the invention is to provide means of the kind indicated in which the actuating ring carries a range, or distance, scale which is so disposed in relation to a focal length scale located on the objective mounting and extending in the axial direction that the edge of the actuating ring serves as reading index for the focal length scale and the center line of the focal length scale serves as reading index for the range scale.

In order at the same time to make it possible to determine the depth of focus in a simple and readily readable manner depth of focus curves are preferably provided on the objective mounting symmetrically in relation to the focal length scale and with the diaphragm factor as parameter, the arrangement being such that the points of intersection of said curves with the range scale directly indicate the depth of focus limits.

Figure 2:
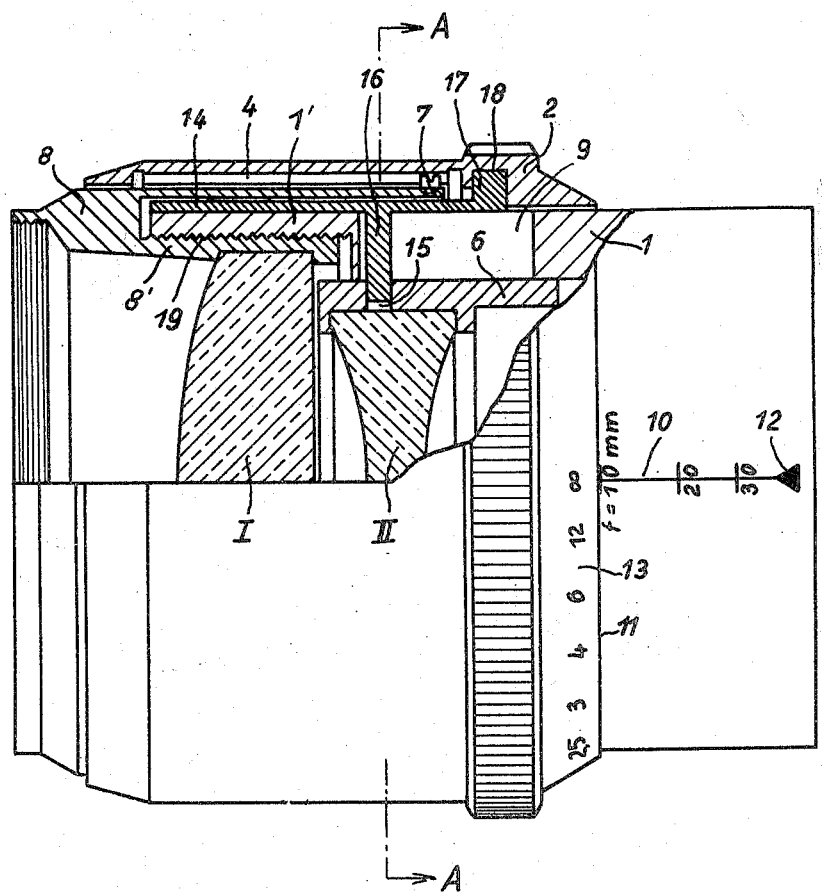
Figure 3:
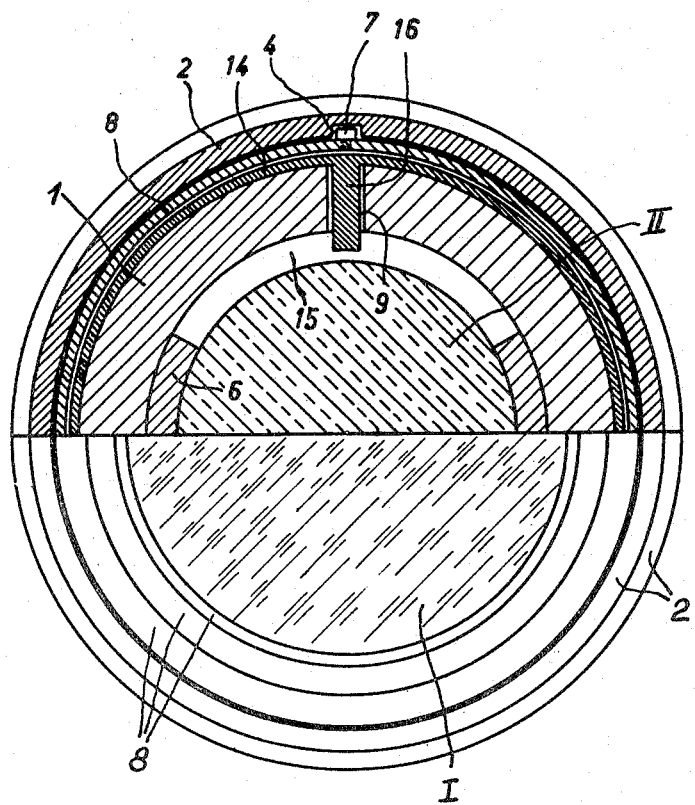
Figure 4:
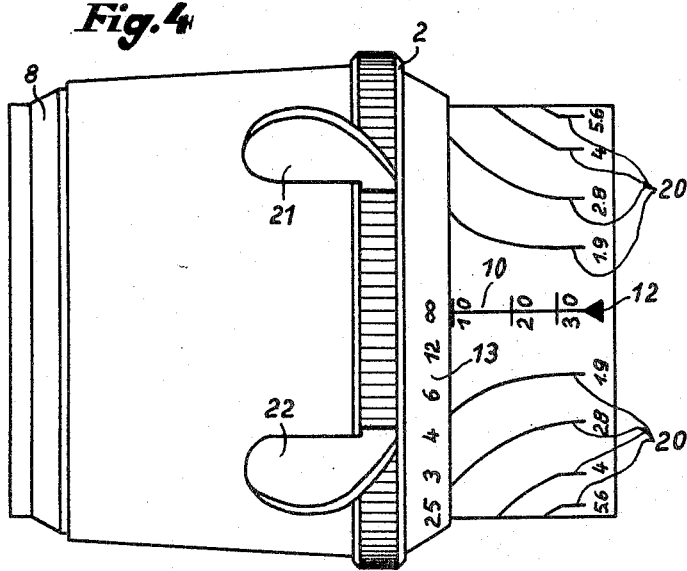
Figure 5:
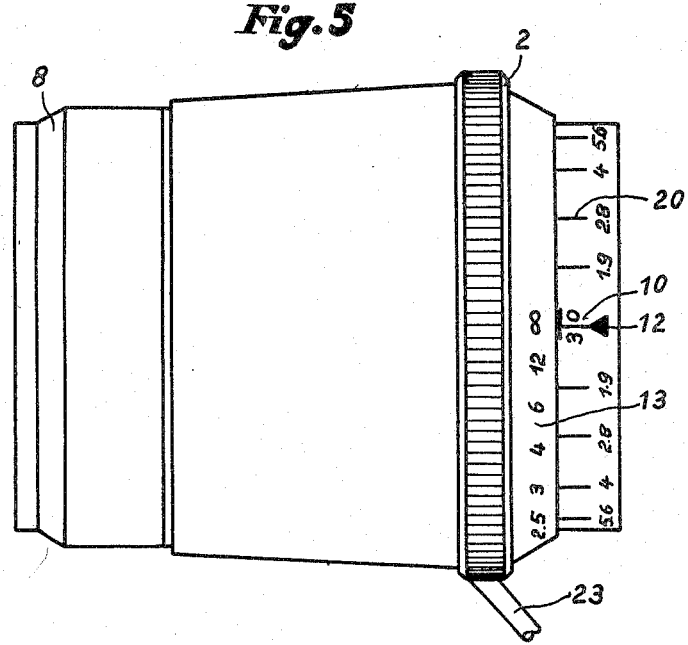

Further objects and advantages of the invention will be apparent from the following description with reference to the accompanying drawings, in which:

FIG. 1 shows a plan view and partial longitudinal section of an embodiment of the invention, FIG. 2 is a similar view of another embodiment of the invention, FIG. 3 is a front elevation and partial section on line A—A of the embodiment shown in FIG. 2, FIG. 4 is a plan view of a slightly modified embodiment showing the arrangement of the scales on the objective mounting, and FIG. 5 is a similar view of another modification.

In FIG. 1, an objective mounting 1 with two lenses I and II is provided with an actuating ring 2 which is displaceable axially of said mounting 1 and rotatable about the optical axis of the objective. The actuating ring 2 is provided with an interior circular groove 3 and an interior straight groove 4 extending axially to the portion 2' of said actuating ring 2. A pin 5 connected with a focal length adjustment member 6 extends into the circular groove 3, and said pin 5 is movable axially of the objective in a slot 9 in the objective mounting 1. In the axial groove 4 in the actuating ring 2 a lug 7 engages which is connected with a front lens holder 8, and said lug 7 is freely slidable in the groove 4 during axial displacement of the actuating ring 2 until engaged by the portion 2' of said actuating ring 2.

Movement of the actuating ring 2 in the axial direction causes axial displacement of the focal length adjustment member 6 due to the cooperation of the pin 5 and the circular groove 3. This focal length adjustment is indicated on a focal length scale 10 on the objective mounting 1, the edge 11 of the actuating ring 2 thereby serving as reading index.

The axial movement of the actuating ring 2 has no effect upon the front lens holder 8. If, however, the actuating ring 2 is rotated, the front lens holder 8 is also caused to rotate due to the cooperation of the lug 7 and the groove 4 whereby focusing of the objective can be effected through relative movement of the portion 8' of the front lens holder 8 and the portion 1' of the objective mounting 1 on the threads 19. During rotation of the actuating ring 2 the pin 5 slides in the circular groove 3 so that the focal length adjustment ring 6 remains unaffected by such rotation. The amount of rotation of the actuating ring 2 and thereby the focal distance adjustment can be observed on a focal distance scale 13 on the actuating ring 2 by means of the center line of the focal length scale 10 which forms a reading index 12.

In the embodiment of FIGS. 2 and 3 an intermediary ring 14 is provided between the actuating ring 2 and the objective mounting 1. Said intermediary ring 14 is provided with a lug 16 which extends through the slot 9 in the objective mounting 1 and into a circular groove 15 in the focal length adjustment ring 6. The intermediary ring 14 is further provided with a projection 17 which extends into a groove 18 in the actuating ring 2. Except for these differences the embodiment of FIGS. 2 and 3 is identical with FIG. 1 and the same reference marks are used for corresponding parts.

Axial movement of the actuating ring 2 causes the lug 16 to move the focal length adjustment member 6 in the axial direction. The front lens holder 8 remains unaffected by this movement. By rotation of the actuating ring 2 the front lens holder 8 is rotated while the lug 16 slides in the circular groove 15 so that accordingly the focal length adjustment member 6 remains unaffected by the rotation of the actuating ring 2. The scales 10 and 13 are identical with those in FIG. 1 and used in the same way for the same purposes.

In the embodiment shown in FIG. 4 the actuating ring 2 is provided with finger grip members 21, 22 to facilitate operation thereof. Furthermore, the objective mounting 1 is provided with depth of focus curves 20 arranged symmetrically relative to the scale 10 and marked with the diaphragm factor as parameter, and the points of intersection of said curves with the focal distance scale 13 indicate directly the depth of focus limits. FIG. 5 shows the actuating ring 2 in the position corresponding to a 30 mm. focal length and it can be seen that with this setting the depth of focus ranges are narrower than in FIG. 4. The actuating ring 2 is in FIG. 5 provided with a lever 23 serving as a handle to facilitate operation.

It is obvious that in all the embodiments shown simultaneous adjustment of focal distance and focal length can be effected by simultaneous rotation and axial displacement of the actuating ring 2.

Structural changes and modifications of the embodiments shown are feasible within the scope of the invention, and the appended claims are intended to cover such changes and modifications.

What we claim is:

1. In objectives for photographic and moving picture cameras, an objective mounting, means within said objective mounting movable axially therein for adjustment of the focal length of the objective, means in said objective mounting rotatable therein for adjustment of the focal distance, annular actuating means mounted on said objective mounting for rotary and axially sliding motion in relation to said objective mounting, an axial slot in said objective mounting, substantially sleeve-like means disposed within said actuating means and secured thereto, radially extending projection means on said substantially sleeve-like means projecting radially therefrom through said axial slot in said objective mounting, a circular slot in said focal length adjustment means for slidably receiving said radially projecting means on said substantially sleeve-like means, an interior straight axial groove in said actuating means, and lug means on said exposure range adjustment means extending into said straight groove and slidable therein.

2. In objectives for photographic and moving picture cameras of the type having means for adjusting focal length and means for adjusting the focal distance, an objective mounting, annular actuating means substantially surrounding said objective mounting and adapted for rotary and axially sliding movement relative thereto, an axial slot in said objective mounting, means within said objective mounting movable axially for adjustment of the focal length of the objective, radially extending projection means extending through said axial slot in said objective mounting with its end received in an annular slot in said actuating means and connecting said actuating means with said focal length adjustment means for relative rotary movement while preventing relative axial movement thereof, and pin and slot means connecting said actuating means with said focal distance adjustment means for relative axial movement while preventing relative rotary movement thereof, said annular actuating means being provided with a circular focal distance scale, and a rectilinear axial length of focus scale on said objective mounting, said scales being so arranged that the circular edge of said actuating means serves as an index for said length of focus scale while the center line of said length of focus scale serves as an index for said focal distance scale.

3. In objectives for photographic and moving picture cameras as set forth in claim 2, wherein said objective mounting is provided with a plurality of depth of focus curves with the diaphragm factor as parameter, said curves being arranged symetrically relative to said length of focus scale such that their points of intersection with said focal distance scale directly indicate the depth of focus limits.

References Cited by the Examiner
UNITED STATES PATENTS

| | | | |
|---|---|---|---|
| 2,902,901 | 9/59 | Back | 88—57 |
| 2,988,974 | 6/61 | Clifford | 95—44 |

NORTON ANSHER, *Primary Examiner.*

D. B. LOWE, JOHN M. HORAN, *Examiners.*